United States Patent [19]

Olander

[11] 4,196,696
[45] Apr. 8, 1980

[54] SHOCK ABSORBER FOR TEAT CUP LINER

[75] Inventor: Karl E. Olander, Sodertalje, Sweden

[73] Assignee: Alfa-Laval AB, Tumba, Sweden

[21] Appl. No.: 875,625

[22] Filed: Feb. 6, 1978

[30] Foreign Application Priority Data

Feb. 22, 1977 [SE] Sweden ............................ 7701928

[51] Int. Cl.² ............................................. A01J 5/04
[52] U.S. Cl. ................................................. 119/14.51
[58] Field of Search ............... 119/14.51, 14.36, 14.47,
119/14.48, 14.49, 14.5, 14.52

[56] References Cited

U.S. PATENT DOCUMENTS

| 2,099,884 | 11/1937 | Green | 119/14.51 |
| 2,694,379 | 11/1954 | Hein | 119/14.47 |

Primary Examiner—Louis G. Mancene
Assistant Examiner—Robert P. Swiatek
Attorney, Agent, or Firm—Cyrus S. Hapgood

[57] ABSTRACT

A teat cup liner is formed at the tube end with a series of external elongated projections of elastic material extending lengthwise of the liner and distributed evenly around the circumference of the tube end to provide it with a shock absorber.

6 Claims, 5 Drawing Figures

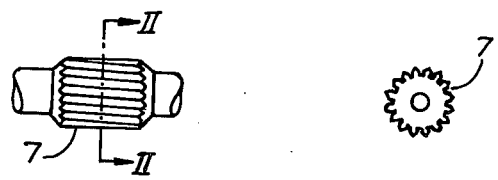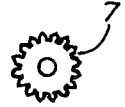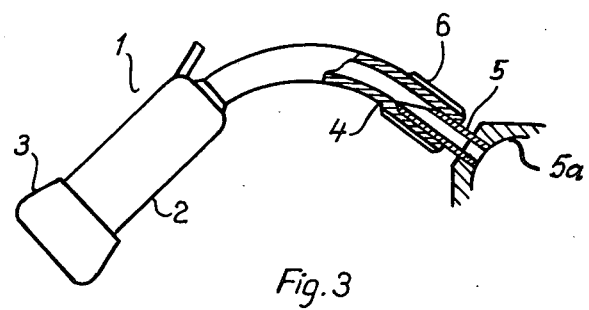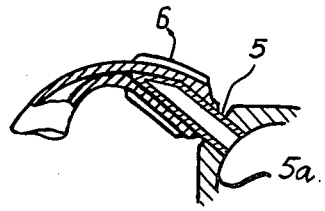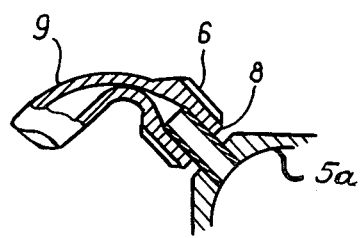

SHOCK ABSORBER FOR TEAT CUP LINER

This invention relates to a shock absorber for the tube end of the teat cup liner of a milking means, the tube end being adapted for threading upon a pipe nipple.

In the equipment heretofore used for milking of cows, the teat cup liner of the milking means is connected to a so-called milk claw by threading the tube end of the teat cup liner upon a pipe nipple which has been cut obliquely and which is attached to the milk claw. The milk is conveyed through the connection so formed, under the influence of a vacuum maintained in the milk claw. It is possible to close the connection between the teat cup liner and said pipe nipple by suspending the milking means in such a manner that part of the tube wall covers the bevelled nipple end, which faces upwardly.

This known device suffers from the drawback that the tube end of the teat cup liner, which during the milking operation is inevitably exposed to shocks, is damaged by the bevelled nipple end, even causing leakage. It has been attempted to remove this drawback by providing the tube end of the teat cup liner with a thickening, such as a sleeve integrated with the tube end (i.e., made from rubber). It has become obvious, however, that such a device will not solve the problem. Furthermore, there is a considerable cost involved in providing the connections of the milk claw for the teat cup liners with bevelled ends.

An object of the present invention is to provide a shock absorber which removes the above-mentioned drawbacks, that is, which eliminates the risks of shock damages and makes it possible to close the teat cup liner from the milk claw irrespective of the design of the connecting pipe nipple. It should be possible to form the latter either bevelled, as hitherto, or simply with a squarely cut end.

According to the invention, the tube end of the teat cup liner is provided externally with substantially axial elongated projections made of an elastic material and substantially evenly distributed around the circumference of the tube end.

The resulting shock absorber will protect the teat cup liner efficiently from shock damages, since the projections absorb impact energy. Thickenings at the tube ends of teat cup liners do not provide this protection but transfer the impact, without any substantial energy absorption, to the contact area between the tube end and the pipe nipple, which acts abrasively on the tube end. With the new structure, the tube end is protected in all positions that may occur, i.e., when the tube is held straight or inclined. Furthermore, a teat cup liner may be closed from connection with its milk claw simply by suspending the milking means, irrespective of the design of the pipe nipple (bevelled or squarely cut), as will be obvious from the following.

In one preferred embodiment of the shock absorber, the projections are formed substantially like ridges, the symmetry planes of which extend radially from the longitudinal axis of the tube end.

In an especially preferred embodiment, the axial length of the projections is at least 1½ times the external diameter of the tube end.

To achieve the best effect, the height of the projections, determined from the external surface of the tube end, should be about 20 to 30% of the external diameter of the tube. In one especially preferred embodiment, there are 12 to 20 projections.

From a manufacturing point of view, it is especially advantageous to provide projections integrated with the teat cup liner, i.e., to make the teat cup liner and its shock absorber in one single rubber piece.

One embodiment of the shock absorber shall be described more in detail in the following, reference being made to the attached drawing.

In the drawing,

FIG. 1 is a side elevation of a shock absorber according to the present invention, and FIG. 2 is a sectional view along line II—II in FIG. 1.

FIG. 3 shows a milking means with the tube end of the teat cup liner threaded upon the bevelled pipe nipple of a milk claw, the view being partly in sectional view and partly in side elevation.

FIG. 4 is a sectional view of the same object, in closed position, whereas

FIG. 5 is a similar view of a shock absorber according to the invention which is threaded upon a squarely cut pipe nipple, with the tube end in closed position.

Referring to FIG. 3, the teat cup 1 of a milking means includes the usual shell 2 containing a liner having a wide end 3 closely surrounding the teat-receiving end of the teat cup shell. The other end 4 of the liner is threaded upon a bevelled pipe nipple 5 of a milk claw 5a. A shock absorber 6 is provided at the end 4. It is obvious from FIGS. 1 and 2 that the shock absorber is formed from a number of projections 7 in the form of ridges.

As shown in FIG. 4, the connection of the teat cup liner to the bevelled pipe nipple 5 may be closed by bending down the teat cup liner, the bevelled opening being closed by the teat cup liner. In FIG. 5 it can be seen how a teat cup liner, provided with a shock absorber according to the invention, may be closed by bending it down, in the case where the teat cup liner is threaded upon a squarely cut pipe nipple 8. In this case, the teat cup liner is squeezed due to the change-over from the end which has been stiffened by the shock absorber, to the rest of the teat cup liner 9.

I claim:

1. A teat cup liner having a wide end engageable with a teat cup shell and also having a tube end adapted to be threaded upon a pipe nipple, said tube end having a series of external elongated projections extending substantially lengthwise of the liner and consisting essentially of an elastic material, said projections being distributed substantially evenly around the circumference of the tube end and forming a shock absorber for the tube end.

2. The liner of claim 1, in which said projections are ridge-like and have symmetry planes extending radially from the longitudinal axis of the tube end.

3. The liner of claim 1, in which the length of said projections is at least 1½ times the external diameter of the tube end.

4. The liner of claim 1, in which the height of said projections, measured from the external surface of the tube end, is about 20 to 30% of the external diameter of the tube end.

5. The liner of claim 1, in which there are 12 to 20 of said projections.

6. The liner of claim 1, in which said projections are integral with the liner.